United States Patent
Dix

(10) Patent No.: US 12,139,341 B2
(45) Date of Patent: Nov. 12, 2024

(54) TROUGH BELT CONVEYOR

(71) Applicant: Bollegraaf Patents and Brands B.V., Appingedam (NL)

(72) Inventor: Jorrit Wijnand Dix, Appingedam (NL)

(73) Assignee: Bollegraaf Patents and Brands B.V., Appingedam (NL)

( * ) Notice: Subject to any disclaimer, the term of this patent is extended or adjusted under 35 U.S.C. 154(b) by 0 days.

(21) Appl. No.: 17/596,933

(22) PCT Filed: Jun. 23, 2020

(86) PCT No.: PCT/NL2020/050408
§ 371 (c)(1),
(2) Date: Dec. 22, 2021

(87) PCT Pub. No.: WO2020/263083
PCT Pub. Date: Dec. 30, 2020

(65) Prior Publication Data
US 2022/0234832 A1    Jul. 28, 2022

(30) Foreign Application Priority Data
Jun. 27, 2019  (NL) .................................. 2023394

(51) Int. Cl.
*B65G 15/08*    (2006.01)
*B65G 15/62*    (2006.01)
*B65G 21/10*    (2006.01)

(52) U.S. Cl.
CPC .............. *B65G 15/08* (2013.01); *B65G 15/62* (2013.01); *B65G 21/10* (2013.01);
(Continued)

(58) Field of Classification Search
None
See application file for complete search history.

(56) References Cited

U.S. PATENT DOCUMENTS 2,594,342 A * 4/1952 Pettyjohn ............... B65G 17/02
                                                     198/821
3,338,383 A * 8/1967 Hashimoto ............ B65G 15/40
                                                     198/819
(Continued)

FOREIGN PATENT DOCUMENTS

| EP | 0301609 A1 | 2/1989 |
| FR | 2836135 A1 | 8/2003 |
| KR | 20120071579 A | 7/2012 |

OTHER PUBLICATIONS

International Search Report for corresponding International Application No. PCT/NL2020/050408 dated Dec. 22, 2020, 5 pages.

*Primary Examiner* — Kavel Singh
(74) *Attorney, Agent, or Firm* — Pearne & Gordon LLP

(57) ABSTRACT

Trough belt conveyor having a flexible conveyor belt loop (6) tensioned around end pulleys (3, 4). Trough forming surfaces (12) are provided under opposite side edge portions (11) of a transport section (7) of the belt (6) and are inclined upward from the transport deck (9) in a laterally outward direction transverse to the transport path (8). The transport section (7) of the belt (6) rests on the transport deck (9) and on the trough forming guide surfaces (12) so as to form a trough extending along the transport path (8). Passages (14) are provided at least in the trough forming guide surfaces (12) or in zones of the transport deck (9) along the trough forming guide surfaces (12), for allowing material caught between the conveyor belt (6) and the trough forming guide surfaces (12) to drop through the guide surfaces (12) or the transport deck (9).

11 Claims, 3 Drawing Sheets

(52) U.S. Cl.
CPC ...... *B65G 2201/02* (2013.01); *B65G 2201/04* (2013.01); *B65G 2207/48* (2013.01)

(56) References Cited

U.S. PATENT DOCUMENTS

| | | | | |
|---|---|---|---|---|
| 4,535,884 | A * | 8/1985 | Suppan | B65G 67/606 |
| | | | | 198/716 |
| 4,676,367 | A * | 6/1987 | Nolte | B65G 39/12 |
| | | | | 198/821 |
| 4,760,913 | A * | 8/1988 | Tschantz | B65G 15/08 |
| | | | | 198/828 |
| 5,246,102 | A * | 9/1993 | Rappen | B65G 15/08 |
| | | | | 198/828 |
| 5,875,883 | A | 3/1999 | Ertel et al. | |
| 5,915,527 | A | 6/1999 | Nakamura | |
| 8,033,385 | B2 * | 10/2011 | Brewka | B65G 39/125 |
| | | | | 198/830 |
| 9,573,763 | B2 * | 2/2017 | Lurie | B65G 23/32 |
| 11,643,274 | B2 * | 5/2023 | Boursier | B65G 15/34 |
| | | | | 198/804 |
| 2011/0226591 | A1 * | 9/2011 | Neubecker | B65G 23/14 |
| | | | | 198/626.4 |
| 2012/0061212 | A1 * | 3/2012 | Brewka | B65G 15/08 |
| | | | | 198/819 |
| 2013/0277181 | A1 | 10/2013 | Kuiper | |

* cited by examiner

TROUGH BELT CONVEYOR

FIELD AND BACKGROUND OF THE INVENTION

The invention relates to a trough belt conveyor for conveying bulk material.

In a trough belt conveyor a flexible conveyor belt loop is tensioned around a pair of end pulleys at opposite ends of the belt conveyor. The conveyor belt loop has a momentarily upper transport section extending along a transport path over a transport deck and a momentarily lower return section extending under the transport deck.

Trough forming guide surfaces extend along the transport section under opposite side edge portions of the transport section. The trough forming guide surfaces are each inclined upward from the transport deck from under the transport section of the conveyor belt in a laterally outward direction transverse to the transport path. The transport section of the conveyor belt rests on the transport deck and on the trough forming guide surfaces with transverse sag so as to form a trough extending along the transport path.

Material being transported stays in the trough without requiring side guides that are subject to wear, while closing off or avoiding gaps between the belt and the side guides, through which in particular fine particles can escape, is problematic. Trough belt conveyors are particularly suitable for transporting bulk material that are fine or include a fraction of fine particles, such as sand, gravel, cement and coal.

SUMMARY OF THE INVENTION

It is an object of the present invention to provide a trough belt conveyor, which is of simple construction yet versatile, durable and reliable in operation.

According to the invention, this object is achieved by providing a belt conveyor according to claim 1. The trough forming guide surfaces form a simple and reliable support for forming a through having a constant cross-sectional width with very little variation along the length of the transport section. The trough forming guide surface can easily be provided as an option to a side guide, so that a basic belt conveyor system can efficiently be provided in a trough belt version and in a flat belt with side guides version. Because passages are provided at least in the trough forming guide surfaces or in zones of the transport deck along the trough forming guide surfaces, material that is caught between the conveyor belt and the trough forming guide surfaces drops through the guide surfaces or the transport deck when it arrives at one of the passages. Accordingly, the extent to which particles are dragged along between the conveyor belt and the trough forming guide surfaces of the transport deck over long distances and thereby cause wear of the conveyor belt, the guide surfaces and the transport deck as well as additional friction and dust formation, is substantially reduced.

According to the invention, a belt conveyor according to claim 1 is provided.

Under a transition from the lower section to the less steep upper section, at least one roller is provided, which has a horizontal axis of rotation perpendicular to the transport path and has a circumference of which a section projects upwardly from the transport deck, so that the trough is locally shallow or absent in a section of the belt above the roller. Thus the belt is allowed to bend from the lower section to the less steep upper section without overstretching over outer portions of the belt. This further contributes to the durability of the belt conveyor.

Particular elaborations and embodiments of the invention are set forth in the dependent claims.

Further features, effects and details of the invention appear from the detailed description and the drawings.

DETAILED DESCRIPTION

Figure 1:
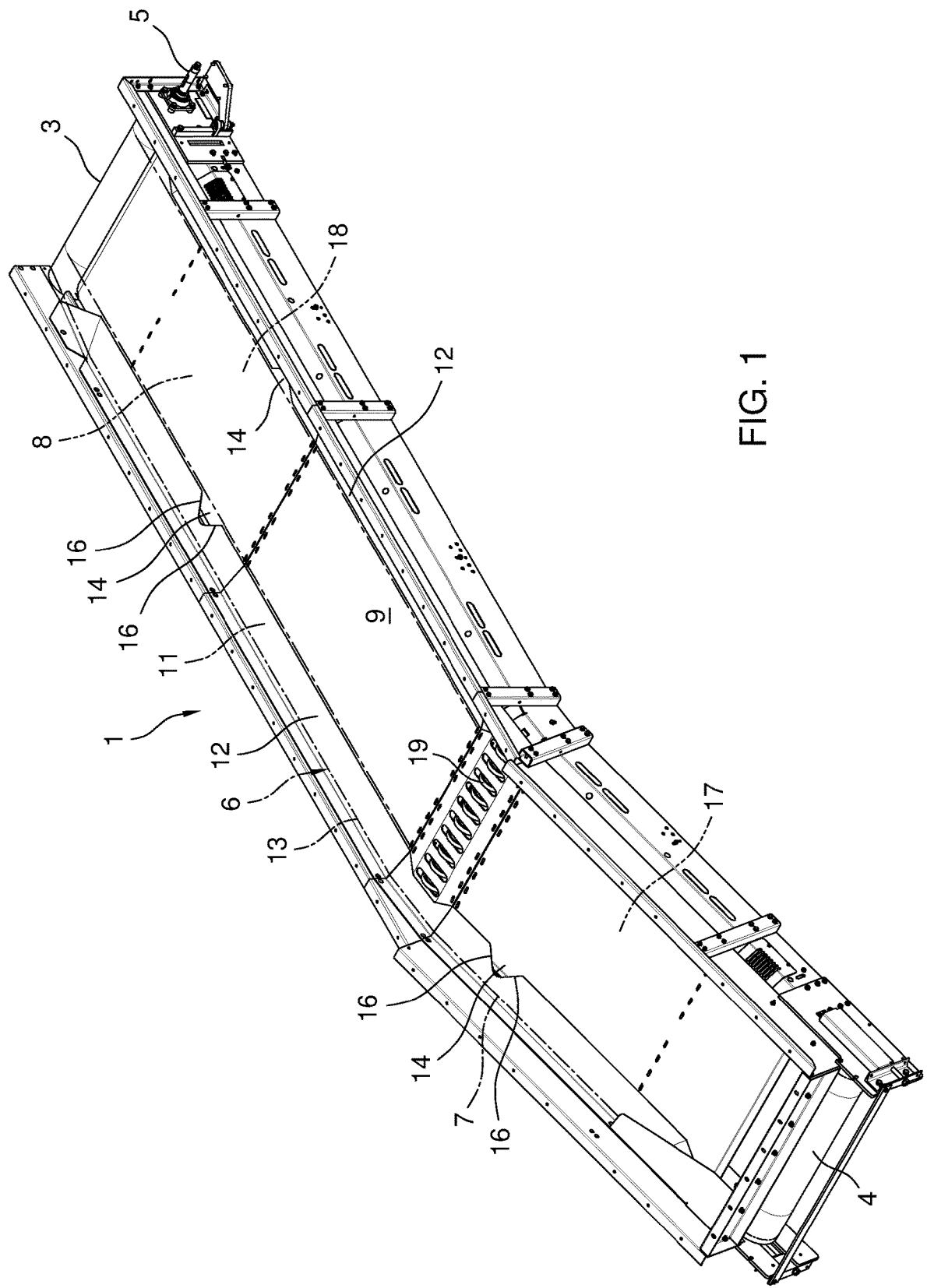
FIG. 1 is a perspective view of an example of a belt conveyor according to the invention.

In the drawings, an example of trough belt conveyor 1 according to the invention is shown. The belt conveyor has a frame 2 to which upper and lower end pulleys 3, 4 are rotatably suspended at opposite ends of the belt conveyor 1. In this example, the upper end pulley 3 is coupled to a drive shaft 5 via which it can be driven as a driven pulley. The motor driving the driven pulley can be part of the belt conveyor 1 or be an external motor. The pulley 4 at the lower end of the belt conveyor 1 is an idler pulley.

Figure 2:
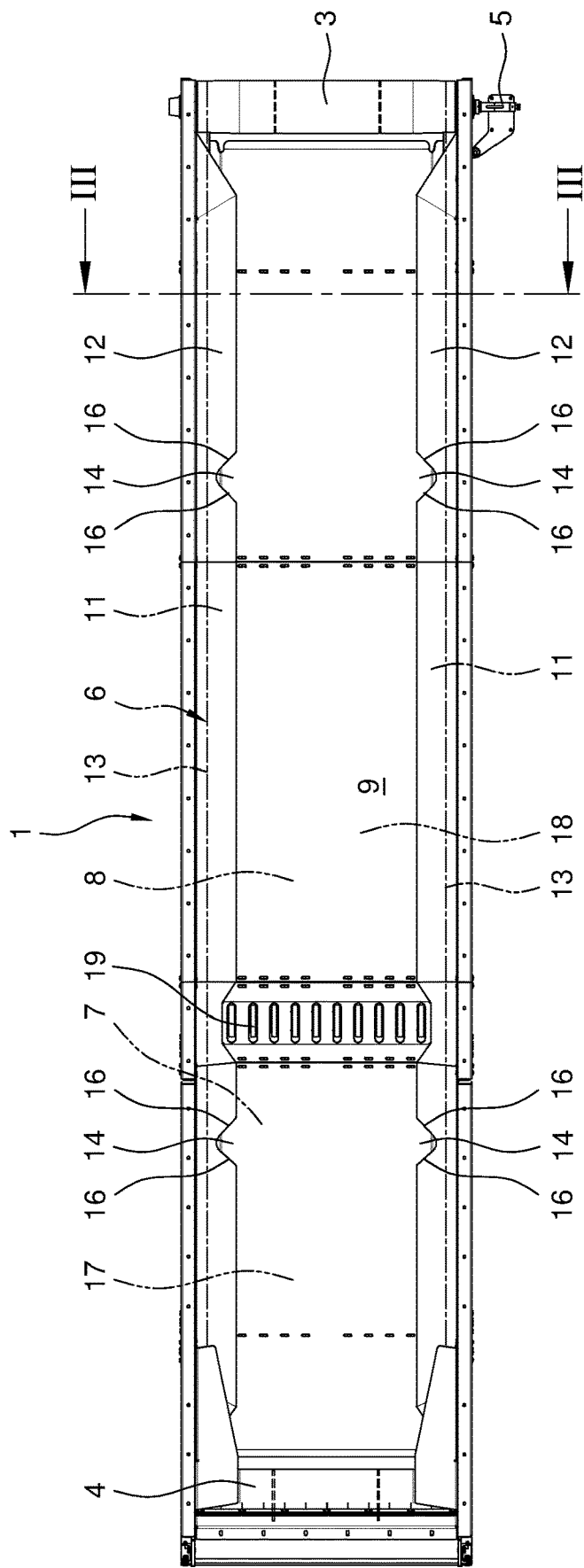
FIG. 2 is a top plan view of the belt conveyor shown in FIG. 1.

A flexible conveyor belt loop 6 is tensioned around the end pulleys 3, 4. In FIGS. 1 and 2, the conveyor belt 6 is not shown, but only indicated by dash-and-dot lines, to avoid obscuring other parts of the belt conveyor 1 from view. The conveyor belt loop 6 has a momentarily upper transport section 7 extending along a transport path over a transport deck 9 and a momentarily lower return section 10 extending under the transport deck 9. The transport path 8 is formed by a generally central flat strip of the top surface of the upper transport section 7 from one end of the conveyor belt loop 6 to the opposite end of the conveyor belt loop 6. In FIGS. 1 and 2, the transport path 8 is indicated by dash-and-dot lines.

Figure 3:
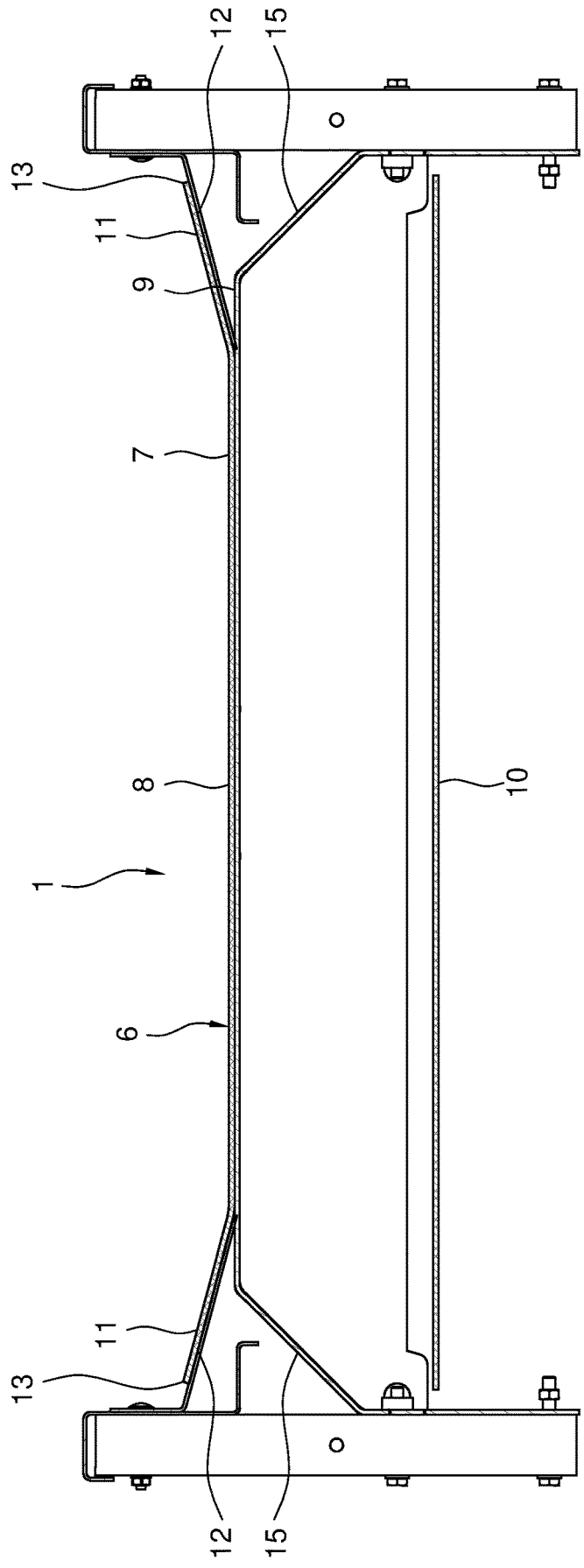
FIG. 3 is a cross-sectional view along the line III-III in FIG. 2, leaving out parts remote from the cross-sectional plane.

Under opposite side edge portions 11 of the transport section 7, trough forming guide surfaces 12 extend along the transport path 8. The trough forming guide surfaces 12 are each inclined upward from the transport deck 9 from under the transport section 7 of the conveyor belt 6 in a laterally outward direction transverse to the transport path 8. The transport section 7 of the conveyor belt 6 rests on the transport deck 9 and on the trough forming guide surfaces 12 with transverse sag so as to form a trough extending along the transport path 8. The inclined opposite side edge portions 11 of the transport section 7 of the conveyor belt 6 keep material being transported away from edges 13 of the transport section 7 of the conveyor belt 6, so that no side guides are needed to keep the material being transported from falling off from lateral sides of the transport section 7 of the conveyor belt 6. Seen in transverse cross-section, as in FIG. 3, the side edge portions 11 of the transport section 7 of the conveyor belt 6 may for instance be oriented at an angle of 5-25°, preferably 10-20° and more preferably about 15° relative to the transport deck 9.

In the trough forming guide surfaces 12, passages 14 are provided for allowing material caught between the conveyor belt 6 and the trough forming guide surfaces 12 to drop through the guide surfaces 12. Although the transport section 7 of the conveyor belt 6 forms a trough with inclined side strips 11, some times some material particles nevertheless fall over one of the side edges 13 of the conveyor belt. When caught between the conveyor belt 6 and the trough forming guide surfaces 12, such particles are to some extent entrained by the belt 6 and cause friction and wear of the trough forming side surfaces 12, of the belt 6 and also of the top surface of the transport deck 9 if the particles migrate down to the transport deck 9. Because the passages 14 are provided, material that is caught between the conveyor belt 6 and the trough forming guide surfaces 12 upstream of the passages 14, drops through one of the passages 14 when it arrives at that passage, so that the average distance over which the particles are entrained is substantially reduced. Accordingly, the extent to which particles are dragged along between the conveyor belt 6 and the trough forming guide surfaces 12 and thereby cause wear of the conveyor belt, the guide surfaces and the transport deck as well as additional friction and dust formation, is substantially reduced.

Such passages may alternatively or additionally also be provided in zones of the transport deck along the trough forming guide surfaces, so that also particles moving inwardly of the trough forming side surfaces can drop away from between the transport section of the conveyor belt and the surface over which the transport section of the conveyor belt slides.

In the present example, the transport deck is in the form of a pan 9 which has a top surface which is flat in a horizontal direction transverse to the transport path 8. Such a flat surface provides an even support of the transport section 7 of the conveyor belt 6 and forms a simple construction, but particles can be dragged along between such a surface and the transport section 7 of the conveyor belt 6 causing considerable friction and wear, so that in particular for a belt conveyor having such a flat pan support of the transport section 7 of the conveyor belt 6, the presence of passages 14 allowing particles to drop away from between the transport section 7 of the conveyor belt 6 and the surface of which the transport section 7 of the conveyor belt 6 rests is of particular advantage. However, also in a conveyor in which the central portion of the conveyor belt rest on for instance a row or pattern of rollers, passages for allowing particles to drop away quickly from between the transport section of the conveyor belt and supporting trough forming surfaces are advantageous for reducing wear, friction and dust formation.

If particles drop through the passages, it is of advantage if these particles do not drop on other parts of the belt conveyor 1, such as the return section 10 of the belt conveyor 1. For this purpose, the conveyor according to the present example is provided with chutes 15 below the transport section 7 of the conveyor belt 6. The chutes are each inclined downward in a direction transverse to the transport path 8 from under the transport section 7 of said conveyor belt 6 to positions laterally outward of the conveyor belt 1. In particular if there is enough vertical distance between the transport section and the return section of the conveyor belt, it is also possible to provide a single chute sloping downward from outside one side of the conveyor belt 6 to outside of an opposite side of the conveyor belt, so that all particles that have fallen through the openings are led to one side of the belt conveyor only.

The chute 15 is a plate section contiguous with the pan 9, so that the chute also constitutes a stiffening and reinforcement flange for the pan 9.

Because the chute 15 extends along the transport deck 9 in longitudinal direction of the transport path 8 from one end to an opposite end of the transport deck 9, particles that drop away from between the conveyor belt 6 and the trough forming guide surface 12 or the transport deck 9 are lead away laterally regardless where along the transport deck 9 the particles drop away from between the conveyor belt 6 and the trough forming guide surface 12.

The trough forming guide surfaces 12 mounted with inward edges on top of the transport deck 9 spaced from side edges of the transport deck 9 allow to efficiently manufacture versions of the belt conveyor 1 with a flat transport section of the conveyor belt (for which the transport deck 9 provides a sufficiently wide support) and side guides as well as with a trough shaped transport section of the conveyor belt without side guides. Because the trough forming guide surfaces 12 are removably mounted, the belt conveyor 1 can moreover easily be converted from a trough belt conveyor with a trough shaped transport section of the conveyor belt without side guides into a flat belt conveyor with a flat transport section of the conveyor belt and side guides.

For discharging particles caught between the transport section 7 of the conveyor belt 6 and supporting surfaces under that section 7 of the belt 6 particularly effectively, the passages 14 are in the form of recesses in boundaries of the trough forming guide surfaces 12 where the trough forming guide surfaces 12 meet the transport deck 9.

The passages 14 have edges 16 extending to the transport deck 9 in directions oblique relative to a longitudinal direction of the transport path 8. This causes particles that cling to the belt 6 to be scraped off the moving belt 6 particularly effectively. The directions oblique relative to a longitudinal direction of the transport path 8 are preferably at an angle of 30-60° and more preferably 40-50° relative to the transport path 8.

For ensuring that all particles that are caught between the belt 6 and one of the trough forming guide surfaces 12 or the transport deck can drop away, the passages 14 preferably have a length in longitudinal direction of the transport path 8 of at least 15 cm or, with increasing preference, at least 18 cm or at least 20 cm and/or a width perpendicular to the longitudinal direction of the transport path 8 of at least 5 cm or, with increasing preference, at least 7 cm or at least 8 cm.

For providing sufficient support for the transport section 7 of the conveyor belt 6 and avoiding significant scraping of the belt 6 along downstream edges of the opening 6, the passages 14 have a length in longitudinal direction of the transport path 8 of at most 30 cm or, with increasing preference, at most 27 cm or at most 25 cm and/or a width perpendicular to the longitudinal direction of the transport path 8 of at most 16 cm or, with increasing preference, at most 14 cm or at most 13 cm.

The belt conveyor according to the present example has a lower section 17 of the transport path 8 that is steeper than an upper section 18 of the transport path 8 contiguous with that lower section 17. Under a transition from the lower section 17 to the upper section 18 rollers 19 having a horizontal axis of rotation perpendicular to the transport path 8 and having a circumference of which a section projects upwardly from the transport deck 9 are provided. The trough in the transport section 7 of the conveyor belt 6 is locally shallow or absent in a section of the belt 6 above the rollers 19, so that the belt 6 is allowed to bend from the lower section 17 to the less steep upper section 18 without overstretching over outer portions of the belt 6. This further contributes to the durability of the belt conveyor.

Several features have been described as part of the same or separate embodiments. However, it will be appreciated that the scope of the invention also includes embodiments having combinations of all or some of these features other than the specific combinations of features embodied in the examples.

The invention claimed is:

1. A belt conveyor for conveying bulk material comprising:
   a flexible conveyor belt loop tensioned around a pair of end pulleys at opposite ends of the belt conveyor, the conveyor belt loop having a momentarily upper transport section extending along a transport path over a transport deck and a momentarily lower return section extending under said transport deck,
   trough forming guide surfaces under opposite side edge portions of said transport section and extending along said transport path, said trough forming guide surfaces each being inclined upward from said transport deck from under said transport section of said conveyor belt in a laterally outward direction transverse to the transport path,
   wherein the transport section of the conveyor belt rests on the transport deck and on the trough forming guide surfaces with transverse sag so as to form a trough extending along the transport path, and
   wherein a lower section of the transport path is steeper than an upper section of the transport path contiguous with said lower section, and
   further comprising, under a transition from the lower section to the upper section, at least one roller having a horizontal axis of rotation perpendicular to the transport path and having a circumference of which a section projects upwardly from the transport deck,
   wherein the trough is locally shallow or absent in a section of the belt above the roller.

2. The belt conveyor according to claim 1, wherein passages are provided at least in the trough forming guide surfaces or in zones of the transport deck along the trough forming guide surfaces, for allowing material caught between the conveyor belt and the trough forming guide surfaces to drop through the guide surfaces or the transport deck.

3. The belt conveyor according to claim 2, wherein the transport deck is in the form of a pan, wherein the pan has a top surface which is flat in at least a horizontal direction transverse to the transport path.

4. The belt conveyor according to claim 2, further comprising at least one chute below said transport section of said conveyor belt, wherein said chute is inclined downward in a direction transverse to the transport path from under said transport section of said conveyor belt to positions laterally outward of said conveyor belt.

5. The belt conveyor according to claim 2,
   wherein the transport deck is in the form of a pan, wherein the pan has a top surface which is flat in at least a horizontal direction transverse to the transport path,
   the belt conveyor further comprising at least one chute below said transport section of said conveyor belt, wherein said chute is inclined downward in a direction transverse to the transport path from under said transport section of said conveyor belt to positions laterally outward of said conveyor belt, and
   wherein said chute is a plate section contiguous with said pan.

6. The belt conveyor according to claim 2,
   the belt conveyor further comprising at least one chute below said transport section of said conveyor belt, wherein said chute is inclined downward in a direction transverse to the transport path from under said transport section of said conveyor belt to positions laterally outward of said conveyor belt, and
   wherein said chute extends along said transport deck in longitudinal direction of said transport path from one end to an opposite end of said transport deck.

7. The belt conveyor according to any of claim 2, wherein said trough forming guide surfaces are removably mounted.

8. A The belt conveyor according to claim 2, wherein said passages are in the form of recesses in boundaries of the trough forming guide surfaces where the trough forming guide surfaces meet the transport deck.

9. The belt conveyor according to claim 8, wherein said passages have edges extending to the transport deck in directions oblique relative to a longitudinal direction of the transport path.

10. The belt conveyor according to claim 2, wherein said passages have a length in longitudinal direction of the transport path of at least 15 cm or, with increasing preference, at least 18 cm or at least 20 cm and/or a width perpendicular to the longitudinal direction of the transport path 8 of at least 5 cm or, with increasing preference, at least 7 cm or at least 8 cm.

11. The belt conveyor according to claim 2, wherein said passages have a length in longitudinal direction of the transport path of at most 30 cm or, with increasing preference, at most 27 cm or at most 25 cm and/or a width perpendicular to the longitudinal direction of the transport path 8 of at most 16 cm or, with increasing preference, at most 14 cm or at most 13 cm.

* * * * *